United States Patent
Ekiner et al.

(10) Patent No.: US 6,663,805 B1
(45) Date of Patent: Dec. 16, 2003

(54) PROCESS FOR MAKING HOLLOW FIBER MIXED MATRIX MEMBRANES

(75) Inventors: Okan Max Ekiner, Wilmington, DE (US); Sudhir S. Kulkarni, Wilmington, DE (US)

(73) Assignee: L'Air Liquide Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 10/251,348

(22) Filed: Sep. 20, 2002

(51) Int. Cl.⁷ .................. B01D 69/08; D01D 5/24; B01F 1/08
(52) U.S. Cl. .................. 264/45.9; 96/10; 96/13; 55/DIG. 5; 264/172.11; 264/209.5
(58) Field of Search .................. 95/45, 47–55; 96/8, 10, 12, 13, 14; 264/45.9, 171.26, 172.11, 209.3, 209.5, 211.12; 55/524, DIG. 5

(56) References Cited

U.S. PATENT DOCUMENTS

| | | | |
|---|---|---|---|
| 3,339,341 A | * 9/1967 | Maxwell et al. | 95/53 |
| 4,061,724 A | * 12/1977 | Grose et al. | 423/705 |
| 4,544,538 A | * 10/1985 | Zones | 423/706 |
| 4,740,219 A | 4/1988 | Kulprathipanja et al. | 95/51 |
| 4,802,942 A | 2/1989 | Takemura et al. | 156/244.13 |
| 4,925,459 A | 5/1990 | Rojey et al. | 155/16 |
| 4,973,606 A | 11/1990 | Sterzel et al. | 521/27 |
| 5,085,676 A | 2/1992 | Ekiner et al. | 55/158 |
| 5,127,925 A | 7/1992 | Kulprathipanja et al. | 55/16 |
| 5,141,642 A | * 8/1992 | Kusuki et al. | 210/490 |
| 5,181,940 A | * 1/1993 | Bikson et al. | 95/47 |
| 5,320,512 A | 6/1994 | Moore, Sr. | 425/131.5 |
| 5,753,121 A | 5/1998 | Geus et al. | 210/490 |
| 6,296,684 B1 | * 10/2001 | Ekiner | 95/45 |
| 6,383,265 B1 | * 5/2002 | Ekiner | 96/10 |
| 6,387,269 B1 | 5/2002 | Eitner et al. | 210/640 |
| 6,395,067 B1 | * 5/2002 | Kuznicki et al. | 95/47 |
| 6,472,016 B1 | * 10/2002 | Soria et al. | 427/245 |
| 6,500,233 B1 | * 12/2002 | Miller et al. | 95/50 |
| 6,503,295 B1 | * 1/2003 | Koros et al. | 95/51 |
| 6,508,860 B1 | * 1/2003 | Kulkarni et al. | 95/51 |

* cited by examiner

*Primary Examiner*—Robert H. Spitzer
(74) *Attorney, Agent, or Firm*—Jeffrey C. Lew; Linda Russell

(57) ABSTRACT

Isopycnic or asymmetric mixed matrix hollow fiber membranes for gas separation can be made by a continuous spinning process. Mixed matrix membranes are characterized by a continuous phase of selectively gas permeable polymer in which are uniformly dispersed discrete absorbent particles such as molecular sieves that also have selectivity enhancing properties. The fibers can be monolithic in which the fiber wall is entirely mixed matrix, or composite in which an active mixed matrix layer is positioned adjacent to a supporting substrate layer. The novel mixed matrix hollow fiber membranes provide higher selectivity than dense film membranes of the continuous phase polymer.

11 Claims, No Drawings

PROCESS FOR MAKING HOLLOW FIBER MIXED MATRIX MEMBRANES

FIELD OF THE INVENTION

This invention relates to a spinning process for making hollow fiber membranes that are used in gas separation processes. More specifically, it relates to a process for spinning hollow fibers having mixed matrix membrane compositions.

BACKGROUND OF THE INVENTION

The use of selectively gas permeable membranes to separate the components of gas mixtures is a well developed and commercially very important art. Such membranes are traditionally composed of a homogeneous, usually polymeric composition through which the components to be separated from the mixture are able to travel at different rates under a given set of driving force conditions, e.g. transmembrane pressure and concentration gradients.

Gas separation membranes are provided in various forms such as flat, spiral wound and pleated sheets and tubes. The hollow fiber membrane module is a commercially preferred form of gas separation membrane equipment because it presents an extremely large gas transfer area per unit volume and especially per unit of module cross section area. The basic element of such a module is a very small diameter hollow fiber comprising a selectively gas permeable material. Typically hundreds or thousands of the hollow fibers are aligned substantially parallel to each other in bundles and positioned within a cylindrical housing to form a module. The ends of the bundles are "potted" usually in a polymeric resin and the fiber ends are kept open. The module is thus structured much like a conventional tube and sheet style fluid heat exchanger. U.S. Pat. No. 3,339,341 to J. M. Maxwell et al. the entire disclosure of which is hereby incorporated herein by reference provides a thorough description of the structure of certain hollow filament membrane modules.

Many embodiments of gas separation membrane modules use fibers of asymmetric structure in which the selectively gas permeable material forms an ultra-thin fiber skin that ideally fully covers the gas transfer area, i.e., the external generally cylindrical surface of the fiber. The skin is the active gas separation portion of the fiber.

In other embodiments, the hollow fibers can be a composite structure in which the selectively gas permeable material is in a layer on one surface of a microporous substrate material layer. The separating material can be in the form of an ultra thin dense layer or an asymmetric layer. The separating material can be deposited either on the outside surface of the fiber or the inside surface of the fiber.

A relatively recent advance in this field utilizes mixed matrix membranes. Such membranes are characterized by a heterogeneous, active gas separation layer comprising a dispersed phase of discrete particles in a continuous phase of a selectively permeable polymeric material. The dispersed phase particles are microporous materials, such as zeolites, carbon molecular sieves and other molecular sieve materials, that have discriminating adsorbent properties for certain size molecules. Chemical compounds of suitable size can selectively migrate through the pores of the dispersed phase particles. In a separation of gases involving a mixed matrix membrane, the dispersed phase material is desirably selected to provide separation characteristics which provide improved permeability and/or selectivity performance of the mixed matrix membrane relative to that of a homogeneous polymeric membrane of the continuous phase material.

The fabrication of hollow fibers for gas separation modules typically involves extruding the nascent fiber through narrow channel extrusion dies, occasionally called "spinnerettes", at very high shear rates. The manufacture of mixed matrix hollow fibers also normally calls for axially drawing the nascent fibers to provide them with precise and uniform cross section dimensions. For these and other reasons, the production of hollow fiber mixed matrix is highly problematic and conventional hollow fiber membranes do not utilize mixed matrix compositions. It is very desirable to provide hollow fiber which utilize mixed matrix compositions for the active gas separation membrane portion of the fiber so as to obtain better permeance and selectivity than polymer-only membrane compositions.

SUMMARY OF THE INVENTION

Accordingly there is now provided a process for making mixed matrix hollow fiber membrane for gas separation comprising, (A) providing a spinnerette adapted to extrude at least one nascent hollow fiber, (B) feeding a bore fluid through the spinnerette to form a cylindrical fluid stream for each hollow fiber, (C) feeding through the spinnerette to an annular channel surrounding the fluid stream for each hollow fiber a suspension comprising molecular sieve particles uniformly dispersed in a polymer solution comprising a selectively gas permeable polymer and a solvent for the selectively gas permeable polymer, and (D) immersing the nascent hollow fiber in a coagulant for a duration effective to solidify the selectively gas permeable polymer, thereby forming a monolithic mixed matrix membrane hollow fiber.

This invention also provides a process as just described which further comprises feeding through the spinnerette to a second annular channel surrounding the fluid stream for each hollow fiber a core polymer solution comprising a core polymer dissolved in a core solvent, thereby depositing a nascent annular core layer of core polymer solution around the bore fluid stream and a nascent annular sheath layer of the suspension around the nascent annular core layer, to form a nascent composite mixed matrix membrane hollow fiber, in which the nascent composite mixed matrix membrane hollow fiber is immersed in a coagulant for a duration effective to solidify the core polymer and the selectively gas permeable polymer, thereby forming a composite hollow fiber having an inner polymer core and an outer mixed matrix membrane sheath.

There is further provided a mixed matrix hollow fiber membrane for gas separations comprising a monolithic annular wall comprising a continuous phase of a selectively gas permeable polymer and a discrete phase of selectively gas permeable molecular sieve particles uniformly dispersed throughout the continuous phase in which the weight ratio of selectively gas permeable molecular sieve particles of the discrete phase to selectively gas permeable polymer of the continuous phase is within the range of about 0.05–0.4.

Yet additionally the invention provides a mixed matrix composite hollow fiber membrane for gas separations having an annular core comprising a core polymer and an annular, mixed matrix sheath externally adjacent to the core, in which the sheath comprises a continuous phase of a selectively gas permeable polymer and a discrete phase of selectively gas permeable molecular sieve particles uniformly dispersed throughout the continuous phase in which the weight ratio of selectively gas permeable molecular sieve particles of the discrete phase to selectively gas permeable polymer of the continuous phase is within the range of about 0.05–0.4.

The invention still further provides a method of separating components of a gas mixture utilizing a hollow fiber gas separation module having a tube side and a shell side, the method comprising feeding the gas mixture through the tube side or the shell side of the hollow fiber gas separation module and withdrawing a permeate gas mixture from the shell side or tube side, in which the module comprises a plurality of mixed matrix hollow fiber membranes each of which comprises a monolithic annular wall comprising a continuous phase of a selectively gas permeable polymer and a discrete phase of selectively gas permeable molecular sieve particles uniformly dispersed throughout the continuous phase and in which the weight ratio of selectively gas permeable molecular sieve particles of the discrete phase to selectively gas permeable polymer of the continuous phase is within the range of about 0.05–0.4.

In a particular aspect of the invention the nascent fiber is drawn from the spinnerette through an air gap and a liquid coagulation bath at a draw ratio of about 1–6 to produce a monolithic or composite asymmetric hollow fiber mixed matrix membrane having an outer diameter of about 100–500 $\mu$m.

DETAILED DESCRIPTION

This invention is directed to the manufacture of hollow fibers that are suitable for use in multiple fiber gas separation modules. Such fibers are generally tubular in form and have an outside diameter of about 75 to about 1000 $\mu$m, preferably about 100 to about 500 $\mu$m, more preferably about 100 to about 400 $\mu$m, and most preferably about 125 to about 250 $\mu$m. The wall thickness can be in the range of about 25 to about 300 $\mu$m, and preferably about 25 to about 75 $\mu$m. Preferably the diameter of the bore, i.e., the inner diameter of the fiber is about one-half to about three-quarters of the outside diameter and will preferably lie in the range of about 50 to about 200 $\mu$m and more preferably about 60 to about 150 $\mu$m.

In one embodiment of gas separation hollow fibers, the fiber is monolithic. By "monolithic" is meant that the whole of the fiber wall is a single element, sometimes referred to as a layer. The wall structure can be completely nonporous such that the entire wall thickness is selectively gas permeable. For many practical reasons, primarily that the flux associated with completely nonporous walled fibers is very low, asymmetric wall structure is preferred. Asymmetric walled hollow fibers are characterized by a thin, nonporous, selectively gas permeable skin at one surface of the fiber and a porous, less dense structure adjacent the skin. Usually, porosity increases and density decreases with radial distance from the skin. The skin is frequently on the outside of the fiber but alternatively can be on the inside. The thickness of the skin is usually less than about 1/10th of the wall thickness.

In a preferred embodiment, the hollow fiber has a multilayer structure comprising a porous substrate and a layer of selectively gas permeable composition adjacent to the substrate. This type of hollow fiber is referred to as a "composite" fiber. The substrate provides structural integrity for the selectively gas permeable layer which is usually much thinner than the substrate. The pores of the substrate provide an unrestricted path for the permeating components of the gas mixture being separated and thus do not appreciably reduce transmembrane flux. The substrate is also frequently much less expensive than the selectively gas permeable material and accordingly, using a substrate reduces the cost of the membrane module without negatively affecting separation performance.

A diverse variety of polymers can be used for the substrate. Representative substrate polymers include polysulfone, polyether sulfone, polyamide, polyimide, polyetherimide, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyquinoxaline, polyamideimides, polyamide esters, blends thereof, copolymers thereof, substituted materials thereof and the like. This should not be considered limiting since any material which can be fabricated into an anisotropic substrate membrane may find utility as the substrate layer of the present invention. Preferred materials for the substrate layer include polysulfone, polyethersulfone, polyetherimide, polyimide and polyamide compositions.

The continuous phase polymer for the gas separating layer is usually chosen to provide high flux and selectivity with respect to components of a gas mixture which is desired to be separated. The range of gas mixtures suitable for separation by selectively permeable membranes is too broad to describe. Some gas mixtures which present a high degree of industrial utility include, for example, $He/N_2$, $O_2/N_2$, $CO_2/CH_4$ and $H_2/CH_4$. Many other gas mixture compositions can be used.

A wide range of polymeric materials have desirable selectively gas permeating properties and can be used as the continuous phase polymer gas separating layer. Representative materials include polyamides, polyimides, polyesters, polycarbonates, copolycarbonate esters, polyethers, polyetherketones, polyetherimides, polyethersulfones, polysulfones, fluorine-substituted ethylene polymers and copolymers such as polyvinylidene fluoride, tetrafluoroethylene, copolymers of tetrafluoroethylene with perfluorovinylethers or with perfluorodioxoles, polybenzimidazoles, polybenzoxazoles, polyacrylonitrile, cellulosic derivatives, polyazoaromatics, poly(2,6-dimethylphenylene oxide), polyphenylene oxide, polyureas, polyurethanes, polyhydrazides, polyazomethines, polyacetals, cellulose acetates, cellulose nitrates, ethyl cellulose, styrene-acrylonitrile copolymers, brominated poly(xylylene oxide), sulfonated poly(xylylene oxide), tetrahalogen-substituted polycarbonates, tetrahalogen-substituted polyesters, tetrahalogen-substituted polycarbonate esters, polyquinoxaline, polyamideimides, polyamide esters, blends thereof, copolymers thereof, substituted materials thereof, and the like. In addition, suitable gas separating layer membrane materials may include those found useful as the dense separating layer of composite gas separation membranes. These materials include polysiloxanes, polyacetylenes, polyphosphazenes, polyethylenes, poly(4-methylpentene), poly(trimethylsilylpropyne), poly(trialkylsilylacetylenes), polyureas, polyurethanes, blends thereof, copolymers thereof, substituted materials thereof, and the like. It is further anticipated that polymerizable substances, that is, materials which cure to form a polymer, such as vulcanizable siloxanes and the like, may be suitable gas separating layers for the multicomponent gas separation membranes of the present invention. Preferred materials for the dense gas separating layer include aromatic polyamide and aromatic polyimide compositions.

Preferred aromatic polyimides for the gas separating layer are disclosed in U.S. Pat. No. 5,085,676, especially at column 4, line 22 through column 7, line 27. Preferred substrate polymers and continuous phase polymers are also described in detail in U.S. Pat. No. 5,085,676, the entire disclosure of which is hereby incorporated herein by reference.

The hollow fiber structure for use in this invention can include a monolithic mixed matrix structure in which the single layer of the fiber comprises the discrete absorbent particles dispersed in the continuous phase polymer. When an asymmetric monolith is used, the discrete particles may be dispersed throughout the monolithic layer, including the less dense portions thereof. To achieve desired results it is important that the discrete particles should be substantially dispersed uniformly in the skin formed by the continuous phase of the asymmetric membrane. For a composite membrane the discrete particles are preferably dispersed only in the active, selectively gas permeable polymer layer. The active layer can be a uniformly dense element or it can be an asymmetric element and the discrete absorbent particles should be dispersed in the active layer as described for a monolithic hollow fiber membrane.

The molecular sieve particle size should be small enough to provide a uniform dispersion of the particles in the suspension from which the mixed matrix membrane will be formed and also to obtain uniform distribution of the dispersed phase particles in the continuous phase of the mixed matrix membrane. The median particle size should be less than about 10 $\mu$m, preferably less than 3 $\mu$m, and more preferably less than 1 $\mu$m. Large agglomerates should be reduced to less than about 10 $\mu$m and preferably less than about 3 $\mu$m. Very fine molecular sieve particles may be made by various techniques such as by choosing appropriate synthesis conditions or by physical size reduction methods well known to those of ordinary skill in the art, such as ball milling, wet-milling and ultrasonication. In some cases, the size reduction process, e.g., ultrasonication or wet-milling can be advantageously carried out at the same time as reaction of the molecular sieve with a monofunctional organosilicon compound in accordance with certain embodiments of this invention.

The preferred adsorbent materials utilized as the discrete phase particle in the present invention are molecular sieves. Molecular sieves exist in both natural and synthetic forms. They are well known in the art to encompass an extensive variety of species and are described in *Atlas of Zeolite Structure Types* W. M. Meier, D H Olson and Ch. Baerlocher, Zeolites 1996, 17 (A1–A6), 1–230 (hereinafter "IZA"), in *Molecular Sieves: Principles of Synthesis and Identification*, R. Szostak, Van Nostrand Reinhold, (1989), and in *Zeolite Molecular Sieves*, D. Breck, John Wiley and Sons, 1973, (Breck). Molecular sieves that are suitable for use in this invention are also disclosed in U.S. patent application Ser. No. 09/960,194, now U.S. Pat. No. 6,503,860 which is assigned to the same Assignee as this application and the complete disclosures of these references are hereby incorporated herein by reference. Zeolites are a subclass of molecular sieves based on an aluminosilicate composition. Non-zeolitic molecular sieves are based on other compositions such as aluminophosphates, silicoaluminophosphates and silica. Molecular sieves of different chemical compositions can have the same framework structure.

The zeolite framework structure has corner-linked tetrahedra with Al or Si atoms at centers of the tetrahedra and oxygen atoms at corners. Such tetrahedra are combined in a well-defined repeating structure comprising various combinations of 4-, 6-, 8-, 10-, and 12-membered rings. The resulting framework structure is one of regular channels and cages, which has a pore network that is useful for separation. Pore dimensions are determined by the geometry of the aluminosilicate tetrahedra forming the zeolite channels or cages, with nominal openings of 0.26 nm for 6-member rings, 0.40 nm for 8-member rings, 0.55 nm for 10-member rings and 0.74 nm for 12-member rings (these numbers assume ionic radii for oxygen). Those skilled in the art will recognize that zeolites with the largest pores being 8-member rings, 10-member rings, and 12-member rings are considered small, medium, and large pore zeolites, respectively. Pore dimensions are critical to the performance of these materials in catalytic and separation applications, since this characteristic determines whether molecules of certain size can enter and exit the zeolite framework. In practice, it has been observed that very slight decreases in ring dimensions can effectively hinder or block movement of particular molecular species through the zeolite structure.

Representative examples of zeolites are small pore zeolites such as NaA, CaA, Erionite, Rho, ZK-5 and chabazite; medium pore zeolites such as ZSM-5, ZSM-11, ZSM-22, and ZSM-48, and large pore zeolites such as zeolite beta, zeolite L, NaX, NaY, and CaY.

A useful type of molecular sieves is based on carbon. Carbon molecular sieves ("CMS") are a special class of activated carbons, which have the ability to discriminate between molecules on the basis of size. Carbon molecular sieves are typically used to separate molecules based on differential rates of adsorption rather than on the differences in adsorption capacity. Unlike inorganic-oxide molecular sieves which have a well ordered crystalline structure, carbon molecular sieves are non-crystalline or amorphous. CMS can be prepared by pyrolysis of a variety of natural or synthetic polymer precursor materials as is well known in the art.

Another class of molecular sieves is characterized by $AlO_2$ and $PO_2$ units ($AlPO_4$ or aluminum phosphates) of which at least some Al or P constituents optionally may be substituted by other elements such as Si (called silicoaluminophosphates or SAPO's), or metals (called metalloaluminophosphates or MeAPO's) or combinations thereof (called metalloalumino-phosphosilicates or MeAPSO's). These $AlPO_4$, SAPO, MeAPO, and MeAPSO materials are crystalline and have ordered pore structures which accept certain molecules while rejecting others.

A particularly preferred type of molecular sieve used in the mixed matrix membrane of this invention is iso-structural with the mineral zeolite known as chabazite. That is, they are characterized by the chabazite framework structure designated as CHA by the IZA reference. The chabazite type (CHA) molecular sieves are distinguished by channels based on 8-member rings with about 3.8 Å×3.8 Å (0.38 nm×0.38 nm) dimensions.

Additional illustrative examples of CHA type molecular sieves suitable for use in this invention include SSZ-13, SAPO-34, and SAPO-44. SSZ-13 is an aluminosilicate molecular sieve material prepared as disclosed in U.S. Pat. No. 4,544,538, the entire disclosure of which is hereby incorporated by reference.

Another type of molecular sieve suitable for use with this invention is silicalite. Silicalite is a hydrophobic, crystalline silica-based molecular sieve. Silicalite I can be prepared according to the procedure described in U.S. Pat. No. 4,061,724, the disclosure of which is hereby incorporated herein by reference.

A prominent feature of this invention is that the dispersion of discrete phase absorbent particles is uniform throughout the continuous phase despite high shear processing. Another key feature is reduced formation of voids between the continuous phase polymer and the discrete absorbent particles. In one aspect, the invention seeks to achieve these features by adhering the absorbent particles to the continuous phase polymer. Sometimes this is referred to as "compatibilizing" the absorbent particles with the continuous phase polymer.

In one aspect of the invention, compatibility between sieve and polymer is achieved by treating the sieves with a monofunctional organosilicon compound in which this compound becomes bonded to the surface of the molecular sieve. This bonding occurs at only one of the four bond sites of the silicon atom in the compound. The monofunctional organosilicon compound also has one or more substituent moieties, occasionally referred to herein as "linking groups". These are groups which have affinity for the polymeric continuous phase or which chemically react with the polymer of the continuous phase. Hence, attraction between molecular sieve treated with monofunctional organosilicon compound and the continuous phase is enhanced. This reduces the formation of voids at the dispersed phase-continuous phase interface.

The term "monofunctional" emphasizes that the organosilicon molecule has a single tetravalent silicon atom to which only one silanol group of the molecular sieve can bond. The single functional group is sometimes referred to herein as a "displaceable radical". The monofunctional organosilicon compound can have other substituent groups which are functional in different ways. For example, the linking groups can bond or associate with the polymer. This monofunctional aspect of the organosilicon compound is designed to cause the organosilicon compound to attach to the surface of the molecular sieve in a mono-molecular thickness layer and preferably without substantial crosslinking between neighboring attached organosilicon compound molecules. Without wishing to be bound by a particular theory, it is contemplated that the monofunctional organosilicon compound attaches to the sieve largely without blocking the pores.

Polyfunctional organosilicon compounds can also provide desired interfacial adhesion. Polyfunctional compounds can block the molecular sieve pores, build up a network over the molecular sieve surface to an excessive thickness or otherwise interfere with the transport of the migrating molecules through the membrane. Nevertheless, polyfunctional compounds can be effective for enhancing interfacial adhesion in the mixed matrix. With rigorous control of reaction conditions, e.g., by scrupulously maintaining an anhydrous system, polyfunctional organosilicon compounds can form a mono-molecular layer of comparable morphology to that obtained readily by a monofunctional organosilicon compound.

Mixed matrix membranes having improved gas separation performance can be produced by using molecular sieve treated with the monofunctional organosilicon compound which permits the treated sieve particles to bond or associate with the continuous phase polymer. Broadly stated, the procedure for using the compound to join the sieve particles to the polymer includes two major steps. One involves reacting the monofunctional organosilicon compound at the site of the displaceable radical with free silanol on the molecular sieve surface. This step, often called "silanation" of the sieve, typically results in substitution of the displaceable radical of the compound by the silanol of the molecular sieve. A molecular sieve having been treated in this fashion may be said to be "silanated". The monofunctional organosilicon compound thus becomes chemically bonded to the molecular sieve particle via the single silicon atom formerly bonded with the displaceable radical.

The other major step relates to the interaction of the silanated molecular sieve particles with the continuous phase polymer. Two mechanisms for obtaining affinity between the silanated sieve and the polymer are contemplated. Firstly, the linking groups can react with the polymer to form direct chemical bonds therebetween. Alternatively, when the chemical compositions of the linking groups and the polymer are selected to be mutually attractive, the linking groups can associate with the polymer. For example, the linking groups and polymer can be populated with moieties which have mutually attractive polar or dipolar interactions. Affinity can also be attained by reacting or associating the linking groups with a monomer of the continuous phase polymer. That is, the linking groups are caused to react or associate with free monomer so that the sieve-monomer adduct has enhanced affinity for the polymer by virtue of the chemical compatibility of the monomer and the polymer. The step of joining the silanated molecular sieve to the polymer by either reacting or associating the linking groups with the polymer or monomer of the polymer is sometimes referred to herein as "sizing".

The term "associate" is used here to mean that the linking groups and polymer have strong attraction but the bond is less than that which results from chemical reaction. A way to determine whether a linking group is suitable for associating with the polymer calls for silanating a molecular sieve with a monofunctional organosilicon compound having the candidate linking group substituted thereon. The treated sieve is then intimately mixed with the continuous phase polymer, usually by blending a dispersion of the sieve particles in a solvent with a solution of the polymer. After removing the solvent, the mixed matrix material is cross-sectioned by cryo-fracturing and then gold coated. The section is examined by scanning electron microscopy ("SEM") at 10,000–20,000 power magnification. If no gaps are seen between the continuous phase polymer and the embedded particles, then the linking group is deemed to acceptably associate with the polymer for purposes of this invention.

In a preferred embodiment, the monofunctional organosilicon compound has chemical composition of the formula $Si(XYR_1R_2)$ which also may be represented diagramatically by the following structure:

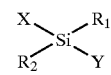

in which X is a displaceable radical,
Y is a linking group, and
$R_1$ and $R_2$ are each independently any radical other than a displaceable radical.

"Displaceable radical" means an active functional group capable of reacting with silanol groups on the molecular sieve such that X is displaced leaving the molecular sieve bonded to the monofunctional organosilicon compound at the X—Si bond position. Preferably, the displaceable radical can be a halogen, a hydroxyl group, or an ester or alkoxy radical having from 1–8 carbon atoms. Any halogen, i.e., fluorine, chlorine, iodine, or bromine atom can be used. A representative ester is the acetoxy radical. Illustrative examples of alkoxy radicals of substituent X include methoxy, ethoxy, n-propoxy and t-butoxy radicals.

The chemical composition of Y will largely depend upon the composition of the continuous phase polymer. The linking group is selected for capability of reacting or associating with the polymer or a monomer of the polymer. Knowing the latter, one of ordinary skill in the art can identify functional groups that can react with the polymer or with a monomer of the polymer. Similarly, the likelihood that a functional group is able to associate with a particular polymer or monomer composition can be estimated by one of ordinary skill in the chemical arts. The usefulness of a particular candidate linking group to react or associate with the polymer can be verified by the method described above. Typical examples of Y which can be used with polymer of suitable co-reactivity include amino radicals, such as aminopropyl and aminophenyl, amido radicals, such as methacrylamido and ethacrylamido, ureido radicals, such as ureidopropylepoxy, epoxy radicals, such as epoxycyclohexyl and glycidoxypropyl, and isocyanoato radicals, such as cyanoethyl and cyanopropyl. $R_1$ and $R_2$ can be nonreactive hydrocarbon radicals including straight chain and branched alkyls, such as methyl, ethyl, n-propyl, isopropyl, n-butyl and t-butyl radicals. Optionally, $R_1$, $R_2$ or both can be a linking group. Illustrative of suitable monofunctional organosilicon compounds include the silanes 3-aminopropyldimethylethoxysilane (APDMS), 3-isocyanatopropyldimethylchlorosilane (ICDMS), 3-aminopropyldiisopropylethoxysilane (APDIPS) and mixtures thereof.

The silanation step for treating the molecular sieve according to this invention typically involves a chemical reaction to condense the monofunctional organosilicon compound onto the molecular sieve at silanol groups on the molecular sieve surface. Usually this is carried out in a suspension of the molecular sieves in a liquid medium of a solvent containing the dissolved compound.

The solvent utilized for the silanation medium is chosen primarily for its ability to dissolve the monofunctional organosilicon compound. It is also desirable that the compound and solvent can form a solution of viscosity which is satisfactory to permit easy mechanical or ultrasonic dispersion of the compound in the medium at desired solution concentrations and temperatures. Preferably temperature of the silanation reaction is about 15–80° C., and more preferably about 25–50° C. The concentration of the compound in solution is preferably about 0.1 to about 5 wt. % and more preferably about 1–2 wt. %. Representative solvents which can be used for dissolving monofunctional organosilicon compound having either alkoxy, hydroxyl or ester displaceable radicals according to this invention include ethanol, methanol, isopropanol, water and mixtures thereof. A preferred solvent is 95:5 ethanol:water solution. For halogen displaceable radicals, anhydrous aprotic solvents should be utilized. Tetrahydrofuran or toluene are representative. Anhydrous aprotic solvents should also be used when the monofunctional organosilicon compound contains hydrolytically unstable linking groups, such as cyano radicals.

The liquid medium ingredients can be agitated to form a completely miscible mixture. The organosilicon compound is added in amount in excess of the stoichiometric amount required to fully react with silanol groups on the molecular sieve to be treated. When the homogeneous liquid medium has been formed, the molecular sieve is added while maintaining the medium in a state of agitation effective to disperse the molecular sieve particles uniformly throughout the liquid. Heat can be applied prior to, during or after addition of the molecular sieve to attain reaction temperature. These conditions are maintained for a duration effective to substantially completely condense the monofunctional organosilicon compound onto the molecular sieve. For monofunctional organosilicon compounds with alkoxy, hydroxyl or ester displaceable radicals, preferably the silanation reaction conditions are continued for about 1 to about 60 minutes. Silanation with compounds having halogen displaceable radicals may call for longer reaction time, i.e., up to about 24 hours, and preferably at a temperature near the boiling point of the solvent. After reaction is completed, the temperature of the reaction mass can be lowered to ambient and the treated molecular sieve particles are then filtered free of excess reactants and washed, preferably repeatedly, in clean solvent to remove trace residual reactants.

When the molecular sieve is silanated with an organosilicon compound having reactive linking groups, the linking groups coupled to the molecular sieve during the silanation step can be further reacted with monomer or polymer in the subsequent sizing step. Sizing step temperature is preferably in the range of about 35–200° C., and more preferably about 120–160° C. The reaction duration is usually about 30 to about 300 minutes. The particles can then be filtered free of excess reactants, washed, dried and stored for later use. This provides molecular sieve particles with monomer or polymer bound to the sieve surface by the organosilicon compound linkage.

In a preferred method of sizing the treated molecular sieves, filtered and cleaned particles of treated molecular sieve from the silanation step are suspended in fresh, dilute solution of about 0.2–5%, preferably about 0.5–1% continuous phase polymer. Representative solvents suitable for this polymer solution include N-methyl pyrrolidone, dimethyl acetamide, dioxane and mixtures thereof The treated molecular sieve particles are added to the dilute solution while maintaining the solution in a state of agitation effective to disperse the particles uniformly throughout the solution. Then this suspension is subjected to sizing step conditions mentioned above. Thereafter, if desired, the treated particles can be filtered, washed and stored as before.

In another aspect, the sizing step can be bypassed. This is an option when the monofunctional organosilicon compound contains reactive linking groups and the continuous phase polymer contains active sites to react with the linking groups under normal membrane formation temperature conditions.

Formation of the mixed matrix membrane is completed typically by dissolving the polymer for the continuous phase in a suitable solvent and dispersing the silanated or silanated-and-sized molecular sieve particles in the resulting polymer solution. The particles can be added to the solution as a powder or as a suspension in a liquid medium. The order of combining ingredients is not critical. In yet another optional process variation, if the reactive linking groups have not yet been reacted with monomer or polymer, the sizing step can be carried out at this time by raising temperature and holding while maintaining the particles dispersed in the reaction medium, as above.

Much attention of this disclosure has been directed to compatibilizing the discrete phase molecular sieve with the continuous phase polymer by using a monofunctional organosilicon compound. Moieties other than monofunctional organosilicon compounds can be used to achieve the desired compatibility and it should be understood that the present invention is not limited to silanation and sizing that involves such monoftmctional organosilicon compounds only. The composition of the compatibilizing agent utilized in any particular application will depend upon the chemical nature of the specific discrete and continuous phase materials. In circumstances for which the chemistry is suitable, the discrete phase molecular sieve particles may be intrinsically compatible with the continuous phase polymer. One of ordinary skill in the art applying the principles described herein should be well apprised of other compatibilizing agents and methods for using them. An example of non-monofunctional organosilicon compound compatibilizers that can be used is 3-aminopropylmonomethyldiethoxysilane ("APPMS").

Although materials selection and treatment represent an important aspect of this invention, processing the materials to fabricate hollow fiber membranes constitutes another important aspect. A typical procedure for producing a composite mixed matrix hollow fiber selectively gas permeable membrane according to this invention involves simultaneously coextruding a sheath suspension of mixed matrix composition and a core solution by utilizing a composite hollow fiber spinnerette design to form a nascent composite hollow fiber membrane which travels through an air gap into a nonsolvent coagulation bath, followed by windup on a drum, roll or other suitable device. Various additional steps such as, post treatment, packaging, and storage may be utilized. It should be noted that a monolithic, i.e., non-composite hollow fiber can optionally be fabricated as above by leaving out steps associated with forming the core solution.

The foregoing description merely juxtaposes certain basic elements. Exemplary conventional processes for producing non-mixed matrix composite hollow fibers are disclosed in U.S. Pat No. 5,085,676 and U.S. Pat. No. 5,141,642, the entire disclosures of which are hereby incorporated by reference herein. Hollow fiber mixed matrix membranes according to this invention can be produced by such conventional processes with modifications as are further described, below.

The composite hollow fiber membranes of this invention preferably comprise a thin outer sheath layer of asymmetric structure containing a selectively permeable continuous phase polymer and a molecular sieve material. The hollow fiber membranes further comprise a microporous polymeric core layer that structurally supports the sheath layer. The choice of the continuous phase polymer is primarily based on the intrinsic gas separation properties and the chemical compatibility of the polymer with the molecular sieve material. The choice of the core layer polymer is largely determined by its mechanical properties, compatibility with the continuous phase polymer of the sheath, and the ability to be processed into a microporous structure.

It is an advantageous feature of the present invention that the novel mixed matrix composite hollow fiber membranes which include discrete molecular sieve particles dispersed in the continuous phase polymer of the selectively permeable layer can be produced by using, basically conventional spinnerette designs. A number of different existing designs for spinnerettes adapted to extrude hollow fiber suitable for gas separation are known in the art. Suitable embodiments of the composite hollow fiber spinnerette designs are disclosed in U.S. Pat. No. 5,320,512 and aforementioned U.S. Pat. No. 5,141,642 the entire disclosures of which are hereby incorporated by reference herein.

In the novel composite hollow fiber spinning process, the mixed matrix suspension for the sheath and core solution may be subjected to high rates of shear, especially in the narrow spinnerette flow channels. Depending on the particular spinnerette design employed and the solution/suspension flow rates utilized, shear rates can reach many thousand reciprocal seconds. It is not unexpected for sheath suspension and core solution are to encounter shear rates in a broad range from about 100 $sec^{-1}$ or less to about 50,000 $sec^{-1}$ during fiber spinning. The microstructural stability of the suspension under applied shear stresses becomes very critical. Moreover, interparticle collision of molecular sieves, especially in converging flow fields, can promote agglomeration which can block the spinnerette channels and/or adversely affect performance of the membrane. The stability of the mixed matrix suspension can be evaluated by measuring the particle size distribution of the mixed matrix slurry prior to feeding to the spinnerette and at the spinnerette exit. If the distributions are substantially alike, the suspension is deemed to be sufficiently stable for use in the spinning process according to this invention.

Other processing factors that can profoundly affect shear stability of the suspension are the concentration of the dispersed phase particles in the suspension and the concentration of the dispersed phase particles relative to the concentration of the polymer in the suspension. The polymer concentration in the spinning solution should be maintained sufficiently high to provide for formation of a substantially completely defect-free integral skin during the spinning process. The upper limit for concentration of the polymer in the spinning solution is dictated by the viscosity of the solution and processing conditions. The upper limit for concentration of the dispersed phase particles is based on these same considerations, and in addition, on the shear stability of the resulting suspension under processing conditions. At higher dispersed phase particle concentration, the shear stress of the solution during processing can increase dramatically and this can cause shear instability of the dispersion. Within practical limits, it has been found that an optimum weight ratio of dispersed phase particles to continuous phase polymer in the suspension, and consequently, in the product membrane, is preferably within the range of about 0.05 to 0.4, and more preferably, about 0.1–0.25. At lower values than 0.05 weight ratio, the desired increase in selectivity resulting from the presence of the dispersed phase is significantly diminished. At higher values, the suspension tends to become unstable under fiber spinning conditions and this causes plugging of the fiber production equipment and/or excessive formation of defects in the separating layer of the fiber. This defect formation occurs as a result of agglomeration of dispersed phase particles or of void formation between the dispersed phase particles and the continuous phase polymer. The optimum ratio of dispersed phase particles to continuous phase polymer as well as the concentration of each within spinning solution for any particular hollow fiber spinning application depends upon such considerations as polymer composition and molecular weight; dispersed phase composition, particle size and particle size distribution; surface area of the dispersed phase particles; composition and fluid dynamic properties of the solvent; presence of additives; processing temperature; type of processing equipment, processing conditions and the like.

After leaving the spinnerette, the fiber velocity is accelerated in the air gap from the extrusion velocity at the spinnerette exit to a wind-up velocity which is determined by the speed of the wind-up device. The wind-up velocity is usually adjusted to elongate the fiber and to draw down the diameter of the nascent composite hollow fiber in the air gap to essentially the desired finished fiber diameter. During draw down the polymer chains of the fiber can also undergo extensional orientation. Upon entering the coagulation bath, the nascent fiber undergoes phase inversion and the fiber structure is thereby solidified before being wound up on the wind-up device.

A commonly used parameter for characterizing the degree of extensional deformation that the fiber experiences in the air gap is referred to as the "draw ratio". This is defined as the ratio of wind-up velocity to the average extrusion velocity. The average extrusion velocity is defined as the volumetric flow divided by the cross sectional area of the annular fiber channel. According to this definition, the fiber inner and outer dimensions are reduced with increasing draw ratio for a particular spinnerette geometry and total volumetric flow rate of bore fluid, core solution, and sheath suspension. Fiber deformation resulting from draw down is beneficial because it provides increased surface area for permeation per unit volume of the hollow fiber module. Another potential advantage is that the fiber mechanical properties may be enhanced due to the extensional orientation of the polymer chains.

Increasing draw ratio results in an increase in the fiber extensional stress profile in the air gap and an increase in the distance between the molecular sieve particles in the axial direction. It is anticipated that during extensional deformation the sheath suspension experiences extensional as well as shear stresses which may affect the polymer solution/molecular sieve interface.

Decreasing draw ratio on the other hand results in larger fiber diameters. In the limit, wind-up velocity approaches the so called free-fall spinning velocity at which the fiber elongates in the air gap only due to the force of gravity. During spinning at free-fall or low-draw ratio velocities, the nascent fiber experiences significantly reduced extensional stress and reduced polymer extensional orientation.

It has been determined that draw ratio has a surprisingly significant effect on the permeation properties of the mixed matrix hollow fibers and that fiber performance can be manipulated by adjusting draw ratio as is illustrated in the examples, below. Preferably the draw ratio should be about 1–10 more preferably about 1–8, and most preferably about 1–6.

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

Comparative Examples 1–4

Fabrication and Use of an Asymmetric, Monolithic, Homogeneous Composition, Hollow Fiber Membrane Produced with Different Draw Ratios.

A polymer solution was prepared according to the following recipe:

| | % |
|---|---|
| Ultem ® 1000 polyetherimide[1] | 32.50 |
| tetramethylene sulfone | 6.50 |

-continued

| | % |
|---|---|
| Acetic anhydride | 1.60 |
| N-methyl-2-pyrrolidone ("NMP") | 59.40 |
| Total | 100.00 |

[1]copolymer of 1,3-phenylenediamine and bisphenol A dianhydride (General Electric Co.)

A bore fluid solution of 90% NMP/10% water was ejected from a needle of a fiber spinnerette at a rate of 45 cm$^3$/hr. The needle was coaxially positioned within an annular fiber spinning channel having a 254 µm inner diameter and a 559 µm outer diameter. The polymer solution was coextruded through the annular channel at 144 cm$^3$/hr with the spinnerette at 90° C. to form a nascent hollow fiber. The nascent fiber traveled through an air gap of 10 cm maintained at room temperature before the fiber was immersed into a coagulant bath of water at 23° C. The resulting water-wet fiber was wound up at a rate of 23 m/min corresponding to a draw ratio of 1.9. (Comp. Ex. 1)

Thereafter the fiber was washed in running water at 50° C. for about 12 hrs. and was dehydrated by replacing the water with methanol and then displacing the methanol with hexane, followed by drying the fibers in a vacuum oven.

The dried composite hollow fiber was treated to seal defects in the selectively gas permeable skin by contacting the outer surface of the fiber for 30 min. with a first solution of 0.2% diethyltoluenediamine in iso-octane, draining the solution away and then contacting the fiber surface for 30 min with a second solution of 0.2% trimesolylchloride and 2% Sylgard 184 (Dow Coming) in iso-octane. Thereafter, the fiber was dried in a vacuum oven at 100° C. overnight.

Permeance and selectivity were determined by pressurizing the bore of the fiber with 689 KPa (100 psi) air at 27° C. and measuring transmembrane flow and permeate concentration.

The above procedure was repeated (Comp. Exs. 2–4) except that the wind up rates of the fibers were changed. Wind up rates, draw ratios, oxygen permeance and $O_2/N_2$ of fibers made as Comparative Examples 1–4 are shown in Table I.

TABLE I

| Example | Wind up rate m/min | Draw ratio | $O_2$ permeance (GPU) | $O_2/N_2$ Selectivity |
|---|---|---|---|---|
| Comp Ex 1 | 23.00 | 1.90 | 11.50 | 6.50 |
| Comp Ex 2 | 40.00 | 3.30 | 10.70 | 6.10 |
| Comp Ex 3 | 60.00 | 4.90 | 13.70 | 7.30 |
| Comp Ex 4 | 75.00 | 6.20 | 7.20 | 6.60 |

Comparative Examples 5–7

Fabrication and Use of an Asymmetric, Monolithic, Homogeneous Composition, Hollow Fiber Membrane Produced with Different Gap Distances.

A polymer (Ultem: Matrimid=8.85:1) solution was prepared according to the following recipe:

|  | % |
|---|---|
| Ultem ® 1000 polyetherimide | 29.2 |
| Matrimid ® polyimide[1] | 3.3 |
| tetramethylene sulfone | 6.5 |
| $CaBr_2$ | 2.4 |
| NMP | 58.6 |
| Total | 100.0 |

[1]copolymer of 5,x-amino-(4-aminophenyl)-1,1,3 trimethyl indane and 3,3', 4,4'-benzophenonetetracarboxylicdianhydride (Vantico, Inc.)

A bore fluid solution of 90% NMP/10% water was ejected from a needle of a composite fiber spinnerette at a rate of 45 cm³/hr. The needle was coaxially positioned with an annular fiber channel having 254 μm inner diameter and 559 μm outer diameter. The polymer solution was coextruded through the annular channel at 140 cm³/hr with the spinnerette at 86° C. to form a nascent hollow fiber. The nascent fiber traveled through an air gap of 10 cm at room temperature before being immersed into a coagulant bath of water at 22° C. The resulting water-wet fiber (Comp. Ex. 5) was wound up at a rate of 90 m/min corresponding to a draw ratio of 7.4.

Thereafter the fiber was washed, solvent exchanged, dried, treated with Sylgard 184 to seal defects and tested as described in Comparative Example 1.

The procedure of Comparative Example 5 was repeated (Comp. Ex. 6 and 7) except that the gap distance was changed. Wind up rates, gap distance, oxygen permeance and $O_2/N_2$ of fibers made as comparative examples 5–7 are shown in Table II.

TABLE II

| Example | Wind up rate (m/min) | Gap distance (cm) | $O_2$ permeance (GPU) | $O_2/N_2$ Selectivity |
|---|---|---|---|---|
| Comp Ex 5 | 90.00 | 10.00 | 5.80 | 7.60 |
| Comp Ex 6 | 90.00 | 5.00 | 6.50 | 7.50 |
| Comp Ex 7 | 90.00 | 2.50 | 8.90 | 7.40 |

Examples 1–5

Fabrication and Use of an Asymmetric, Composite, Mixed Matrix Composition, Hollow Fiber Membrane Produced with Different Draw Ratios.

A calcined aluminosilicate (Si/Al ratio of about 20–24) CHA type molecular sieve was wet-milled in solution of 0.2% 3-aminopropyldimethylethoxysilane ("APDMS") in 95:5 ethanol:water at 50° C. for 30 min. The sieve was then recovered by filtration and further washed three times with isopropanol. The sieve was then dried at 150° C. in a vacuum oven. Treated molecular sieve (10.8 g) was dispersed in 250 g NMP and ultrasonicated to form a suspension. Solution (11.1 g) of 10% Ultem® 1010 in NMP was added to the suspension which was agitated with a mixer at 150 rpm for 4 hrs at 140–160° C. Thereafter the molecular sieve particles were washed thrice with NMP and recovered by filtering.

The molecular sieve produced as above was ultrasonicated in NMP. To this suspension was added Ultem® 1000, NMP and tetramethylenesulfone to make a sheath polymer suspension ("C") of 30% polyetherimide, 4.5% molecular sieve particles, 9% tetramethylenesulfone and balance NMP.

A core polymer solution ("B") of Ultem:Matrimid (8.85:1) was also prepared as described in Comparative Example 5.

A bore fluid solution of 90% NMP/10% water was ejected from a needle of a composite fiber spinnerette at a rate of 45 cm³/hr. The needle was coaxially positioned with an annular fiber channel having 254 μm inner diameter and 559 μm outer diameter. The core polymer solution B and sheath polymer plus zeolite suspension C were coextruded through the channel at 125 cm³/hr and 15 cm³/hr respectively at a spinnerette temperature of 86° C. The solutions C and B were juxtaposed such that a sheath layer formed concentrically outside and adjacent a core layer to form a nascent composite hollow fiber. The nascent fiber traveled through an air gap of 10 cm at room temperature before immersing into a coagulant bath of water at 22° C. The resulting water-wet fiber was wound up at a rate of 21 m/min. corresponding to a draw ratio of 1.7.

Thereafter the fiber (Example 1) was washed, solvent exchanged, dried, treated with Sylgard 184 to seal defects and tested as described in Comparative Example 1. The procedure of Example 1 was repeated except that the wind up rates of the fibers was changed (Exs. 2–5). Wind up rates, draw ratios, oxygen perneance and $O_2/N_2$ selectivity of fibers made as examples 1–5 are shown in Table III.

TABLE III

| Example | Wind up rate (m/min) | Draw ratio | $O_2$ permeance (GPU) | $O_2/N_2$ Selectivity |
|---|---|---|---|---|
| Ex. 1 | 21.00 | 1.70 | 7.40 | 8.50 |
| Ex. 2 | 40.00 | 3.30 | 7.60 | 8.40 |
| Ex. 3 | 60.00 | 4.90 | 7.80 | 8.30 |
| Ex. 4 | 75.00 | 6.20 | 7.80 | 8.20 |
| Ex. 5 | 90.00 | 7.40 | 9.50 | 8.10 |

The operative examples (Exs. 1–5) demonstrate that the mixed matrix membrane had good oxygen permeance and superior selectivity compared to the homogeneous polymer membranes. Additionally, the selectivity gradually diminished as draw ratio increased but remained higher than any of the homogeneous membrane comparative examples. Comparative Examples 1–4 also show no trend either in selectivity or in permeance as a function of draw ratio for the homogeneous membranes. Interestingly, in Exs. 1–5 permeance increased gradually up to draw ratio of 6.2 and increased at slightly higher rate for draw ratio of 7.4. Thus the hollow fiber mixed matrix membranes of this invention prove capable of providing predictable and consistently good separation characteristics over a manageable range of draw ratios.

Although specific forms of the invention have been selected for illustration in the preceding description in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for making mixed matrix hollow fiber membrane for gas separation comprising,
   (A) providing a spinnerette adapted to extrude at least one nascent hollow fiber,
   (B) feeding a bore fluid through the spinnerette to form a cylindrical fluid stream for each hollow fiber,
   (C) feeding through the spinnerette to an annular channel surrounding the fluid stream for each hollow fiber a suspension comprising molecular sieve particles uniformly dispersed in a polymer solution comprising a selectively gas permeable polymer and a solvent for the selectively gas permeable polymer, (D) immersing the nascent hollow fiber in a coagulant for a duration effective to solidify the selectively gas permeable polymer, thereby forming a monolithic mixed matrix membrane hollow fiber, and (E) drawing the nascent hollow fiber at a draw ratio in the range of about 1–10.

2. The process of claim 1 in which the weight of molecular seive particles divided by the weight of selectively gas permeable polymer in the polymer solution is within the range of about 0.05–0.4.

3. The process of claim 1 which further comprises feeding through the spinnerette to a second annular channel surrounding the fluid stream for each hollow fiber a core polymer solution comprising a core polymer dissolved in a core solvent, thereby depositing a nascent annular core layer of core polymer solution around the bore fluid stream and a nascent annular sheath layer of the suspension around the nascent annular core layer, to form a nascent composite mixed matrix membrane hollow fiber, in which the nascent composite mixed matrix membrane hollow fiber is immersed in a coagulant for a duration effective to solidify the core polymer and the selectively gas permeable polymer, thereby forming a composite hollow fiber having an inner polymer core and an outer mixed matrix membrane sheath.

4. The process of claim 1 in which the molecular sieve particles comprise chabazite type zeolite.

5. The process of claim 4 in which the chabazite type zeolite is SSZ-13.

6. The process of claim 1 which furthercomprises the step of reacting the molecular sieve particles with a monofunctional organosilicon compound prior to feeding the suspension through the spinnerette.

7. The process of claim 6 in which the monofunctional organosilicon compound has the formula Si(XYR1R2) in which X is displaceable radical, Y is a linking group, and R1 and R2 are each independently any radical other than a displaceable radical.

8. The process of claim 1 in which the nascent hollow fiber has an outer diameter in the range of about 100–500 $\mu$m.

9. The process of claim 1 in which the draw ratio is in the range of about 2–6.

10. The process of claim 1 in which the suspension is a stable dispersion at shear rates in the range of 100 to 1000 $sec^{-1}$.

11. The process of claim 1 in which the molecular sieve particles comprise carbon molecular sieves.

* * * * *